United States Patent
Dvinsky et al.

(10) Patent No.: US 9,262,156 B2
(45) Date of Patent: Feb. 16, 2016

(54) METHODS FOR TRANSPARENT MANAGEMENT OF CONTEXT AND STATE IN AN ASYNCHRONOUS CALLBACK FLOW

(71) Applicant: International Business Machines Corporation, Armonk, NY (US)

(72) Inventors: Alexander Dvinsky, Haifa (IL); Alexey Roytman, Givat Elah (IL); Gal Shachor, Yokneam (IL); Konstantin Shagin, Haifa (IL); Bruno Wasserman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 14/178,288

(22) Filed: Feb. 12, 2014

(65) Prior Publication Data
US 2015/0227362 A1    Aug. 13, 2015

(51) Int. Cl.
G06F 9/44    (2006.01)
G06F 9/45    (2006.01)
G06F 9/46    (2006.01)
G06F 9/54    (2006.01)

(52) U.S. Cl.
CPC .. *G06F 8/70* (2013.01); *G06F 8/31* (2013.01); *G06F 8/40* (2013.01); *G06F 9/461* (2013.01); *G06F 9/54* (2013.01)

(58) Field of Classification Search
None
See application file for complete search history.

(56) References Cited

U.S. PATENT DOCUMENTS

| | | | | |
|---|---|---|---|---|
| 6,810,523 B2* | 10/2004 | Segev et al. | | 719/330 |
| 7,797,733 B1* | 9/2010 | Sallam | | 726/4 |
| 8,271,837 B2* | 9/2012 | Prophete et al. | | 714/38.1 |
| 8,510,530 B1* | 8/2013 | Jacobs | | 711/170 |
| 8,768,682 B2* | 7/2014 | Wu et al. | | 703/23 |
| 8,978,016 B2* | 3/2015 | Gataullin et al. | | 717/128 |
| 2003/0028684 A1* | 2/2003 | Segev et al. | | 709/328 |
| 2005/0021689 A1* | 1/2005 | Marvin | | G06F 8/31 709/220 |
| 2009/0293046 A1* | 11/2009 | Cheriton | | G06F 8/40 717/136 |
| 2009/0293073 A1 | 11/2009 | Nathan et al. | | |

(Continued)

OTHER PUBLICATIONS

Tilkov, S., et al., Node.js: Using JavaScript to Build High-Performance Network Programs, Internet Computing, vol. 14, Issue: 6, pp. 80-83, 2010, [retrieved on Oct. 8, 2015], Retrieved from the Internet: <URL:http://ieeexplore.ieee.org/>.*

(Continued)

*Primary Examiner* — Thuy Dao
*Assistant Examiner* — Geoffrey St Leger

(57) ABSTRACT

Computerized methods for providing one or more memory values present in memory during execution of a procedure to be automatically available to an asynchronous callback executed later. The methods comprise receiving a code containing procedures, the procedures having input parameters to be executed as asynchronous callback procedures. The methods further comprise replacing the procedures in the code with wrapper procedures, where the wrapper procedures comprise instructions for storing one or more memory values, storing the asynchronous callbacks of the input parameters, replacing each of the input parameters with a wrapper callback, the wrapper callback comprising instruction for restoring the memory values and executing the asynchronous callbacks. The methods further comprise executing the original procedures. The methods further comprise executing the code with the wrapper procedures, providing the memory values present during execution of the procedure to be automatically available to the asynchronous callback executed later.

18 Claims, 6 Drawing Sheets

(56) References Cited

U.S. PATENT DOCUMENTS

| | | | |
|---|---|---|---|
| 2011/0276983 A1* | 11/2011 | Syme | G06F 9/461 719/314 |
| 2011/0302454 A1* | 12/2011 | Prophete et al. | 714/38.1 |
| 2012/0079463 A1* | 3/2012 | Freeman | G06F 8/70 717/137 |
| 2012/0102109 A1* | 4/2012 | Eberhard | G06F 9/54 709/204 |
| 2012/0260261 A1 | 10/2012 | Tillier | |
| 2014/0040921 A1* | 2/2014 | Li | G06F 9/54 719/320 |
| 2014/0046649 A1* | 2/2014 | Wu et al. | 703/26 |
| 2014/0053157 A1* | 2/2014 | Zhao et al. | 718/100 |
| 2014/0317606 A1* | 10/2014 | Gataullin et al. | 717/128 |

OTHER PUBLICATIONS

Peticolas, D., An Introduction to Asynchronous Programming and Twisted, 2011, 124 pages, [retrieved on Oct. 8, 2015], Retrieved from the Internet: <URL:http://krondo.com/wp-content/uploads/2009/08/twisted-intro.pdf>.*

Stephen Cleary, "Asynchronous Callback Contexts", blog post from Apr. 2009. Can be found at: http://blog.stephencleary.com/2009/04/asynchronous-callback-contexts.html.

* cited by examiner

```
// Modify setTimeout function which receives a callback at index "0"
setTimeout = modify(setTimeout, 0);                    201

// Implementation of a generic modification function
function modify(originalFunction, callbackIndex) {     202

// Modifying function returns a new function
    // <arguments> represents the array of arguments passed to the
    // function being called. One of those arguments is a callback
    // we are going to wrap
    return function(<arguments>) {                     203
        // First, callback is extracted from the list of the arguments
        originalCallback = arguments[callbackIndex];   204

// Currently available context is locally stored in a new
        // instance of a CallbackWrapper class, along with the
        // original callback
        cw = new CallbackWrapper(originalCallback);    205

// Callback in the original arguments list is replaced by
        // the wrapped version
        arguments[callbackIndex] = cw.wrappedCallback; 206

// Original function is invoked and its return value is
        // passed back
        return originalFunction(<arguments>);          207
    }
}
```

FIG. 2

```
// The wrapper class locally preserves the context available
// when the class is constructed and wraps the original with
// code handling the context restoration
class CallbackWrapper {                                          301
    // Publicly available wrapped callback;
    public function wrappedCallback;                             302

// Constructor of the wrapper
    constructor CallbackWrapper(originalCallback) {              303
        // Resolve the context at the moment of callback wrapping
        storedContext = getCurrentContext();                     304

// Construct the wrapped instance of the callback
        this.wrappedCallback = function(<arguments>) {           305
            // Once invoked asynchronously, first thing
            // restore the context
            setCurrentContext(storedContext);                    306

// The context is restored -- call the original callback now
            originalCallback(<arguments>);                       307
        }
    }
}
```

FIG. 3

```
// Modify EventEmitter.addListener function.
// This function receives the callback at index "1".
// To cancel the registration later on
// EventEmitter.removeListener function is to be called with
// the same callback reference.
// Hence we need to preserve a mapping
// between original and wrapped callbacks.
EventEmitter.addListener = modifyWithMapping(EventEmitter.addListener, 1);   501

// Implementation of a generic modification function
function modifyWithMapping(originalFunction, callbackIndex) {                 502
  // Modifying function returns a new function
  return function(<arguments>) {                                              503
    // First, callback is extracted from the list of the arguments
    originalCallback = arguments[callbackIndex];                              504

// Currently available context is locally stored in a new
    // instance of a CallbackWrapper class, along with the
    // original callback
    cw = new CallbackWrapper(originalCallback);                               505

// Callback in the original arguments list is replaced by
    // the wrapped version
    arguments[callbackIndex] = cw.wrappedCallback;                            506

// Retrieve the context available at the moment of scheduling
    context = getCurrentContext();                                            507

// Store the reference to the wrapped callback keyed by
    // the original callback
    context.callbacksMap[originalCallback] = cw.wrappedCallback;              508

// Original function is invoked and its return value is
    // passed back
    return originalFunction(<arguments>);                                     509
  }
}
```

FIG. 5

```
// Modify EventEmitter.removeListener function.
//This function cancels a previously scheduled callback registration.
// The callback is given at index "1".
EventEmitter.removeListener =                                         601
  modifyCanceling(EventEmitter.removeListener, 1);

// Implementation of a generic modifying function
function modifyCanceling(originalFunction, callbackIndex) {           602
  // Modifying function returns a new function
  // <arguments> represents the array of arguments passed to the
  // function being called. One of those arguments is the original
  // callback. We need to find a matching wrapped callback for it
  // and invoke the original function with the wrapped callback
  return function(<arguments>) {                                      603
    // First, callback is extracted from the list of the arguments
    originalCallback = arguments[callbackIndex];                      604

// Retrieve the currently available context
    context = getCurrentContext();                                    605

// Find the previously stored wrapping callback
    wrappedCallback = context.callbacksMap[originalCallback];         606

// Callback in the original arguments list is replaced by
    // the wrapped version
    arguments[callbackIndex] = wrappedCallback;                       607

// Original function is invoked and its return value is
    // passed back
    return originalFunction(<arguments>);                             608
  }
}
```

FIG. 6

METHODS FOR TRANSPARENT MANAGEMENT OF CONTEXT AND STATE IN AN ASYNCHRONOUS CALLBACK FLOW

FIELD AND BACKGROUND OF THE INVENTION

The present invention, in some embodiments thereof, relates to computer development tools and, more particularly, but not exclusively, to context data management across asynchronous callback procedures.

Contemporary procedural programming languages and/or software platforms such as Node.js, Tornado, Twisted, libevent, EventMachine, vibe.d and others may use event-driven, asynchronous input and/or output, referred to herein as I/O, in order to minimize overhead and maximize scalability. In this setting, the application control flow may consist of a callback flow originating from invocation of a procedure in a set of processor instructions determined by the application. The callback flow originating procedure may be any user-defined procedure, third party procedure and/or native application programming interface procedure, referred to herein as an original procedure, but may also be referred to as an original procedure, unmodified procedure, callback flow originating procedure, and the like.

The execution of the original procedure may initiate the later execution of one or more asynchronous callback procedures, usually executed by a single processor thread, one callback scheduling the next one or more callback procedures as needed. The later execution of these one or more asynchronous callback procedures may be referred to as a callback flow and/or control flow. In this context the original procedure may refer to the procedure invocation that produced the callback flow. The asynchronous callback procedure that is later executed may be referred to in this application as the original callback, asynchronous callback and/or original callback procedure. The term original callback and the like may refer to the definition and/or declaration of the callback procedure, the function pointer to the callback procedure, the reference to the callback procedure, and the like, depending on the context the term is used in. It is noted that the execution of the application program itself and/or original procedure may be completed a long time before the callback flow completes execution. As may be defined in procedural programming languages, the terms procedure, function, subroutine, routine and the like refer to execution of defined groups of processor instructions, and may be used interchangeably in this application.

SUMMARY OF THE INVENTION

According to some embodiments of the present invention, there are provided computerized methods for providing one or more memory values present in computer memory during execution of a program procedure to be automatically available to an asynchronous callback procedure executed later. The methods comprise receiving a code containing one or more program procedures, the one or more program procedures having one or more input parameters to be executed as an asynchronous callback procedure. The methods further comprise replacing the one or more program procedures in the code with one or more wrapper procedures, where each of the one or more wrapper procedures comprising instructions for storing one or more memory values, storing the asynchronous callback procedure of the one or more input parameters, replacing each of the one or more input parameters with a wrapper callback procedure, the wrapper callback procedure comprising instruction for restoring the one or more memory values and executing the asynchronous callback procedure. The methods further comprise executing the one or more program procedures. The methods further comprise executing the code with the one or more wrapper procedures, providing the one or more memory values present during execution of the program procedure to be automatically available to the asynchronous callback procedure executed later.

Optionally, the execution of the asynchronous callback procedure initiates execution of one or more additional callback procedures, and each of the one or more additional callback procedures is performed by execution of a corresponding wrapper callback procedure which restores the one or more memory values prior to execution the one or more additional callback procedures.

Optionally, the one or more wrapper procedures and the wrapper callback procedure are made available by one or more computerized interfaces of the types from a list of a source code file, a binary machine instruction file, a header file, a driver file, a library file, a compiled library file, and a remote procedure call.

Optionally, the one or more memory values comprise any data values from the list of local variable values, global variable values, local variable address values, global variable address values, state machine status data values, time data values, date data values, user identification data values, user input data values, server-side computer data values, client-side computer data values, server-side program computer data values, client-side program data values, billing information data values, processor thread information data values, counter data values, procedure timing data values, exception handling data values, system monitoring data values, resource management data values, and the like.

Optionally, the one or more program procedures, the one or more asynchronous callback procedures, the one or more wrapper procedures, and the wrapper callback procedure are developed in a programming environment coded according to the programming syntax of any programming language including Javascript, C#, .NET, Ruby, D, Python, Perl, Java, Groovy, Scala, and the like.

Optionally, the programming environment is any from a list of Node.js, Tornado, Twisted, Perl Object Environment, libevent, Vert.x, Akka, EventMachine, vibe.d, and the like.

Optionally, the one or more wrapper procedures additionally store a mapping between the one or more asynchronous callback procedures and the wrapper callback procedure for use in a manipulation of one or more callback flows, and a manipulating wrapper procedure uses the mapping to manipulate the one or more callback flows.

Optionally, the manipulation comprises any from the list of priority assignment, cancelling, and the like.

Optionally, the term procedure may refer to any from the list of a subroutine, a function, a routine, and the like as used in procedural programming languages.

According to some embodiments of the present invention, there are provided computer program products, comprising a computer usable medium having a computer readable program code embodied therein, the computer readable program code containing processor instructions to implement methods for providing one or more memory values present in computer memory during execution of a program procedure to be automatically available to an asynchronous callback procedure executed later. The computer program products comprise instructions for receiving a code that contains one or more program procedures, the one or more program procedures having one or more input parameters to be executed as an asynchronous callback procedure. The computer program products further comprise replacing the one or more program procedures in the code with one or more wrapper procedures, where each of the one or more wrapper procedures comprises instructions for storing one or more memory values, storing the asynchronous callback procedure of the one or more input parameters, replacing each of the one or more input parameters with a wrapper callback procedure, the wrapper callback procedure comprising instruction for restoring the one or more memory values and executing the asynchronous callback procedure, and executing the one or more program procedures. The computer program products further comprise executing the code with the one or more wrapper procedures, providing the one or more memory values present during execution of the program procedure to be automatically available to the asynchronous callback procedure executed later.

According to some embodiments of the present invention, there are provided computerized devices for providing one or more memory values present in computer memory during execution of a program procedure to be automatically available to an asynchronous callback procedure executed later. The computerized devices comprise one or more processing units configured for receiving code, replacing procedures, storing one or more memory values, replacing asynchronous callback procedures, executing procedures, restoring the one or more memory values, executing asynchronous callback procedures. The computerized devices further comprise one or more input and output interfaces, one or more user interfaces.

Optionally, the computerized devices further comprises a computer housing for containing the one or more processing units, the one or more input and output interfaces, and the one or more user interfaces, the computer housing configured to operate in the environment the devices are located in.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the methods and/or systems of embodiments of the invention can involve performing or completing selected tasks manually, automatically, or a combination thereof. Moreover, according to actual instrumentation and equipment of embodiments of the methods and/or systems of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 is an example of node.js JavaScript resembling pseudo-code to modify a procedure so that the context data is preserved, according to some embodiments of the invention;

FIG. 3 is an example of node.js JavaScript resembling pseudo-code to implement a wrapper callback procedure, according to some embodiments of the invention;

FIG. 5 is an example of node.js JavaScript resembling pseudo-code to modify a procedure so that the context data and procedure mapping are preserved, according to some embodiments of the invention; and FIG. 6 is an example of node.js JavaScript resembling pseudo-code to cancel a previously scheduled callback using stored mapping data, according to some embodiments of the invention.

DESCRIPTION OF EMBODIMENTS OF THE INVENTION

Figure 1:
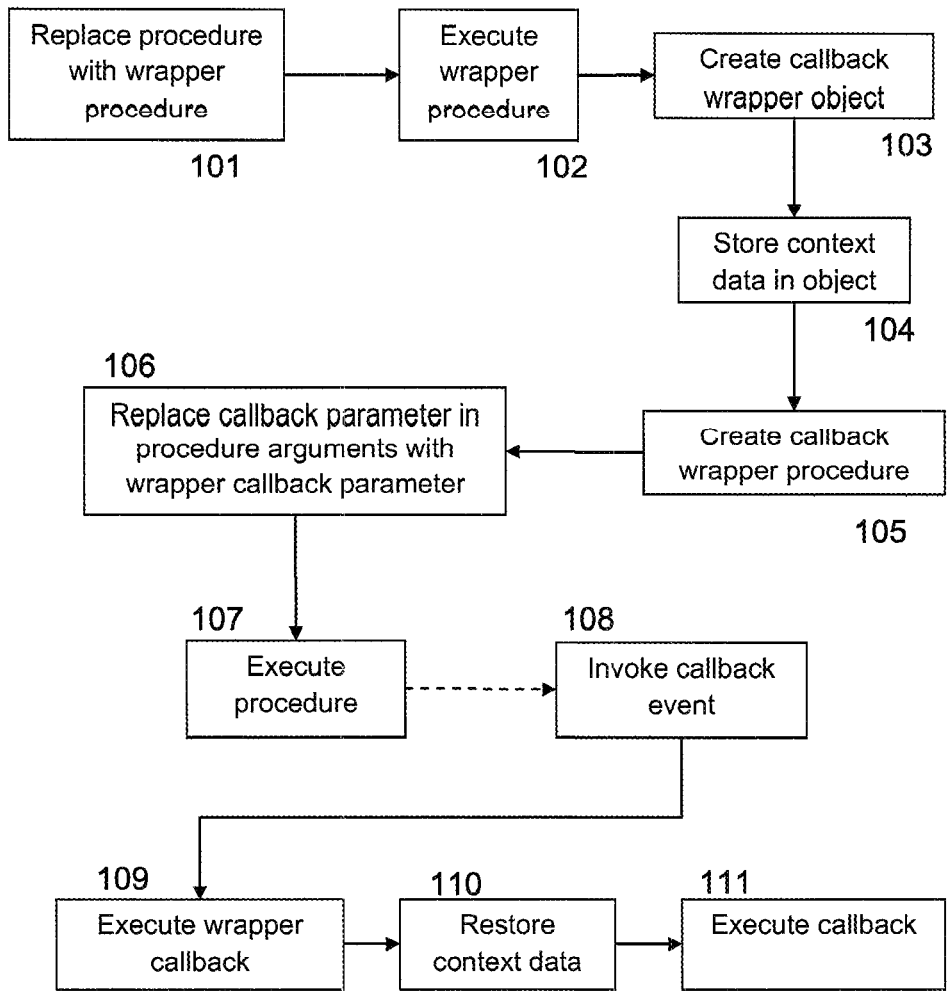
FIG. 1 is a flowchart of a method for preserving context data between a procedure and an asynchronous callback procedure according to some embodiments of the invention.

The present invention, in some embodiments thereof, relates to computer development tools and, more particularly, but not exclusively, to context data management across asynchronous callback procedures.

Contemporary server side scripting frameworks such as Node.js may use event driven, asynchronous input and output in order to minimize overhead and maximize scalability. In this computer instruction development environment, the application callback flow may consist of one or more asynchronous callback procedures, optionally executed by a single processor thread, one callback procedure scheduling the next one or more following callback procedures. The callback procedures of the callback flow may be executed at unknown later times in relation to the original procedure that originated the callback flow. During this time the system memory may have changed, and one or more of the callback procedures may not have access to values in memory at the original procedure execution, and there are no mechanisms inherent to the computer languages and/or procedure libraries to pass context data from the original procedure to any of the callback procedures in the callback flow to another automatically.

For example, a software process to retrieve multiple data from a web server, hard disk, and database server, has an asynchronous callback procedure to return the data to the browser window. In this example, the code contains one procedure to perform the complete operation, a series of three asynchronous callback procedures to retrieve the data, and a final asynchronous callback procedure to return the data to the browser. The callback procedures may be performed asynchronously, also known as non-blocking, deferred and the like, to allow processors to perform other operations while waiting the long time needed to retrieve the data. When the system memory has changed between the execution of the original procedure and the callback procedure, for example when changes have been made to the internal state of the processor, the original state may not be available to the callback procedure. Providing these memory values and/or context data to the deferred callback procedure may be useful in many dedicated applications. In general, preserving context across a callback flow may be useful for any application that needs to coordinate the context and/or state of the processor memory during the callback flow.

Providing the asynchronous callbacks with a shared state and/or context data in real life applications may incur significant coding overhead. Data sharing may be achieved using globally accessible variables and/or by copying and passing the relevant data when one asynchronous callback schedules another. In addition to the implementation and maintenance overhead, the drawback of such solutions may be the fact that they are application specific and therefore may rarely be reused.

The terms state and/or context data may refer to any data values present in memory during execution of the original procedure and may be needed by the asynchronous callback procedure and/or the computer program, and these terms may be used interchangeably in this application. Any context data may also be referred to as the context in this application.

According to some embodiments of the present invention there are provided methods and devices, for standardized automatic context and/or state data management across asynchronous callback procedures in a callback flow. By replacing calls to an original procedure with a standardized, wrapper procedure, such as a program function, which stores the context data before executing the original procedure, and replacing the original callback procedure with a standardized wrapper callback procedure which restores the context data prior to execution of the original callback, one or more memory values may be automatically preserved between the original procedure and the original callback. The methods may be transparent to the developer and therefore may not incur the coding overhead which is present in the alternative methods mentioned above. Consequently, the methods may enhance application program maintainability and reduce software development efforts.

In addition to providing both state and/or context data to the flow of asynchronous callbacks, the proposed methods may be useful in a variety of generic application and/or flow administration tasks. Context data may be used to implement per flow exception handling, profiling, monitoring and/or resource management.

According to some embodiments of the present invention there are provided methods and devices, for preserving the memory values during a callback flow of callback procedures in event-driven, asynchronous input and/or output of computerized data. The implementation of any original procedure of an application programming interface, referred to herein as an API, in a programming and/or scripting language may be replaced with a new, context preserving wrapper procedures which preserves context for the callback flow originating from each invocation of the original procedure.

According to some embodiments of the present invention there are provided methods and devices, for context preservation comprising the actions of: (a) storing the context and/or state and/or memory values, referred to herein as the context; (b) replacing the callback parameter of the original procedure with a wrapper callback procedure parameter; (c) executing the original procedure; (d) at a later time, restoring the context and executing the original callback; and (e) passing the results of the original callback to the application.

Optionally, context includes data from the computerized system environment available in memory during invocation of the original procedure, state information, application specific related data provided by the user and/or programmer, system, remote server, and/or the like.

Optionally, in event-driven software platform events are used to schedule an original callback procedure and the native API may be referred to as a native scheduling API.

Optionally, when software platforms that are not event driven the original callback procedure is executed immediately on completion of the original procedure, but the original callback procedure waits for a "ready" bit to be set to 1 in memory before execution of the callback procedure functionality.

Optionally, a software platform executes an original callback procedure at a later time using any from the list of timer, interrupt, event message, counter, and the like.

Optionally, the original procedure is defined, implemented by the language in a header file, library of procedures, compiled library of procedures residing locally on the computer running the program, remotely on a different computer, and/or the like.

Optionally, the context-preserving procedures are defined by a header file, library, compiled library, low level drivers and/or the like using the same computing language syntax as the original procedure according to the standards defined in the programming and/or scripting language.

The context-preserving procedures may enable recording of billing, metering, logging information, security, and/or processing values relevant to the application for use by a service provider. For example, processor usage time for each processor thread is collected during the callback flow execution and associated with a server-based client account in an application for web hosting. Information and/or data may be passed between the client-side and server-side applications using the context-aware API when running on both platforms, such as for example user preferences or billing information when making search engine choices or internet purchase.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The term original procedure refers to the program procedure before the program procedure has been modified to preserve context memory values. These original procedures may contain one or more callback parameters that are executed at a later time, after execution of the original procedure is completed. The original procedure may be referred to as an unmodified procedure, an untransformed procedure, and/or as an original procedure.

According to some embodiments of the present invention there are provided methods, for preserving context across all original callback procedures in a callback flow, enabling the application programmer transparent, automatic management of the flow of the context data across all original callback procedures emanating from the original procedure. This flow of context data allows the programmer to manage the context data values available to each callback procedure so that all original callback procedures in the callback flow may share information and cooperate in implementing the program application in the event-driven, asynchronous callback flow. For example, if the application requires that identity and/or address of the remote computer client is preserved across callback flows, the original procedures associated with the callback flow are modified with the wrapped procedures, and then during execution the wrapped procedures will store the context data at each invocation of the original procedure, and restore the context data during the callback flow of each invocation. In this example, the context data stored and restored would include identity and/or address of the remote client to be used to direct the results at the end of each callback flow. This automatic context management makes the software written by the programmer much more compact and easier to implement and/or maintain than having to manage the context of the callback flow manually for each application.

For example, an application software code contains one or more original procedures and one or more original callback procedures without preservation of context. A programming development tool for implementing context preservation may be included in the definitions of the software code, where the definitions may include the definition of a generic, standardized modification procedure and a generic, standardized wrapper procedure. The modification procedure may "wrap" the original procedure into a wrapper procedure that first preserves the context, replaces the callback parameter in the argument list with a wrapper callback parameter, and then executes the original procedure. The modification procedure may be done once at the beginning of the program for each original procedure that needs context preservation for the callback flow that the original procedure might initiate on later invocation. The original procedure calls may be replaced with calls to the wrapper procedure by replacing the references to the original procedures with references to each corresponding wrapper procedure.

Upon invocation of each original procedure, the corresponding wrapper procedure may be executed in its place, and may be defined at the time of each specific invocation of that original procedure. For each time the wrapper procedure is executed, the wrapper procedure stores the context, replaces the one or more callback parameters for that invocation of the original procedure with new wrapper callback procedures, and executes the original procedure.

The wrapper procedure is the modified original procedure, and may be referred to as the modified procedure, transformed procedure, and/or the wrapper procedure. The action of modifying the original procedure to presser context may be performed by a modification procedure, which may be done once at the beginning of a program. The procedure calls to and/or invocations of the original procedure are then replaced by the wrapper procedure. Later in the program, at each invocation of the original procedure, the wrapper procedure may be executed which stores the context data values and original callback parameter, replaces the callback parameter in the argument list with a modified callback procedure parameter and executes the original procedure. The modified callback parameter may be referred to as the wrapper callback, modified callback, transformed callback, wrapper callback procedure, modified callback procedure, transformed callback procedure, and the like.

Optionally, the standardized procedures to store and restore the context data values are defined separately for each application.

When the wrapper callback parameter is invoked at a later time, the wrapper callback procedure may be executed which first restores the context data and then executes the original callback procedure. Optionally, in object-oriented programming languages the context data is stores in an object. Optionally, if the original callback procedure also invokes second original procedures, and they too have been replaced with wrapper procedures, the context is preserved from the original procedure to the second original procedures, and further to the second original callback procedures. Thus the context of the original procedure may be preserved throughout the callback flow to all callback procedures.

According to some embodiments of the present invention there are provided methods, for preserving memory values between an original procedure and a callback procedure using wrapper procedures, wrapper callback procedures, context storing procedures, context restoring procedures, and wrapper callback objects defined once in each program for each original procedure, and then automatically preserving context for each callback flow of each invocation of the original procedure.

Optionally, a wrapper callback object is implemented as a persistent memory locations and/or a global memory variable.

Reference is now made to FIG. 1, which is a flowchart of a method for preserving context data between a procedure and an asynchronous callback procedure, according to some embodiments of the invention. In this embodiment, the original procedure calls by the program may be replaced with wrapper procedure calls as at 101, the wrapper procedure containing instructions to store the context data, redirecting the callback parameter to a wrapper callback procedure, and executing the procedure. When the wrapper procedure is executed as at 102 instead of the procedure, the wrapper callback object is created as at 103 storing the context data as at 104, creating the wrapper callback procedure as at 105, and replacing the callback procedure with the wrapper callback procedure as at 106. The procedure is executed as at 107 and after a system initiated callback event is invoked as at 108 the wrapper callback procedure is executed as at 109. The execution of the wrapper callback initiated by the callback event may be delayed till a later time after the completion of the procedure as designated by the dashed connection. Optionally, the wrapper callback procedure 109 will execute immediately. The wrapper callback procedure first restores the context data as at 110 and then executes the callback procedure as at 111. Thus, the context data may be preserved between the time the procedure began execution at 107 and the execution of the callback procedure 111. Optionally, the procedure is invoked by the program code additional times during execution of the software program and the wrapper procedure 102 is executed in place of the original procedure. The original procedure may be replaced only once per program execution with the wrapper procedure.

It is noted here that there may be several programming entities that may be used in embodiments of the invention. There may be an original procedure, that initiates the callback flow or control flow. There may be one or more original callback procedures associated with the original procedure as a parameter in the argument list of the original procedure. These original callback procedures may be the same or different callback procedure. There may be a modification routine that replaces the original procedure with a wrapper procedure, so that when a request to invoke the original procedures is executed by the program code, then the wrapper procedure is invoked in its place. There is the wrapper procedure which may preserve the context and replace the original callback parameter with a wrapper callback parameter. In object oriented programming languages, there may be a wrapper procedure object that stores the context data and contains the object methods described herein. There may be one or more wrapper callback procedures that are executed in place of the original callback procedures and restore the context data prior to invocation of each original callback procedure.

Figure 4:
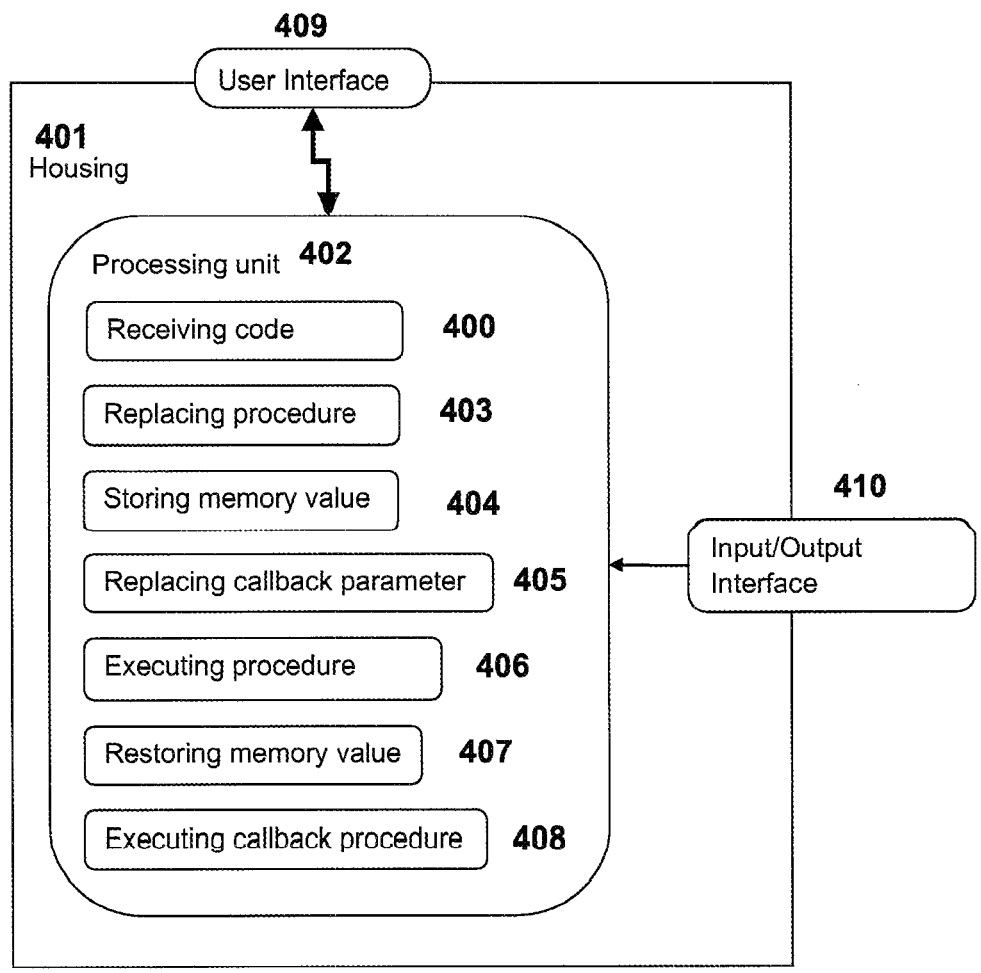
FIG. 4 is a schematic illustration of a device to preserving context data between a procedure and an asynchronous callback procedure, according to some embodiments of the invention.

According to some embodiments of the present invention there are provided devices, for preserving context data between an original procedure and an asynchronous callback procedure. Reference is now also made to FIG. 4, which is a schematic illustration of a device to preserving context data between an original procedure and an asynchronous callback procedure, according to some embodiments of the invention. The device may contain one user or more user interfaces as at 409 for control of the processor and I/O operations. Input and output may be performed through one or more I/O interfaces as at 410, which may enable the callback procedure to retrieve data external to the device. Optionally, the one or more I/O interfaces are comprised of separate input interfaces and separate output interfaces. The device may contain one or more processing units as at 402, any of which may be configured to perform the action of receiving code as at 400 containing one or more original procedures with one or more arguments containing a callback procedure. Any processing unit may be configured to perform the action of replacing the procedure with a wrapper procedure as at 403. Any processing unit may be configured to perform the action of storing the context data needed by the callback procedure as at 404. Any processing unit may be configured to perform the action of replacing the callback procedure parameter with a wrapper callback procedure as at 405. Any processing unit may be configured to perform the action of executing the original procedure as at 406. Any processing unit may be configured to perform the action of executing the wrapper callback procedure at a later time, which instructs the any processor to perform the actions of restoring the context data as at 407, and executing the callback procedure as at 408.

According to some embodiments of the present invention there are provided methods, for a context preserving programming tool consisting of procedures and data objects which allow a programmer to enable context data preservation between any original procedure and any asynchronous callback procedure passed as a parameter to the original procedure. For example, across asynchronous callbacks in a callback flow, one or more of the procedures participating in the callback flow are modified so that they preserve context data. For example, all the low level original procedures that are implemented in a software platform are modified for context data preservation, and then software program implementing these original low level procedures will automatically preserve context data. For example, all database access procedures of a software platform are modified for context preservation of the number of records in query results resulting from each access, and these numbers of records in query results are further used for billing.

Optionally, the parameter in the argument list of the original procedure representing the callback procedure is passed as any of the following list: name of another procedure, a pointer to the callback procedure, an inline macro representing the procedure, a method associated with a data object, a set of inline processor instructions embodied in a procedure, and the like.

Optionally, all predefined procedures and/or callback procedures of a software platform that need to preserve the context are modified to preserve context between the original procedures and callbacks. For example, if during a callback flow one of the procedures or callback procedures has not been modified with the appropriate wrapper procedure, the context may not be preserved. As further example, the low level procedures that participate in asynchronous callback flow are all modified once, at the beginning of each application program, to preserve the context data during the invocations of these low level procedures during the program execution. For example, low level procedures are the procedures that are the closest to the original programming language supplied instructions that the programmer has access to. For example, if the low level procedures have been changed to implement new functionality to augment the original procedures, the programmer may modify the low level procedures used by these changed procedures to preserve context across the callback flow. Alternatively in this example, the programmer may modify the changed procedures to preserve context data during the callback flow, as long as there is a continuous preservation of context data for all callback procedures in the callback flow. When one or more of the procedures executed in the callback flow does not preserve context, the context may not be accurately preserved for all remaining procedures in the callback flow.

Optionally, only some of the procedures in the callback flow preserve context. For example, when a callback flow initiates a subordinate callback flow as part the callback flow operation and when it is not required that the subordinate callback flow has access to the preserved context data, only some of the procedures of the callback flow preserve context data.

Optionally, the context data is domain and/or application specific and created by the invocation of a wrapper callback object.

Optionally, the methods described herein are executed on a server computer.

Optionally, the methods described herein are executed on a client computer.

Optionally, the methods described herein are executed on a cloud based server network.

Optionally, the methods described herein are executed using remote procedure calls.

Optionally, the methods described herein are executed on a multi-threaded processing computer system. For example, the context data contains information on the thread identification value and thus the callback flow executes as on single thread. For example, the context data contains information on the thread identification value and thus billing information may be identified for each callback flow.

Optionally, the original procedure is any procedure of the programming language, a programmer defined procedure, and third party defined procedure, a system procedure, an original procedure, and the like. For example, a program application may have programmer defined procedures that have replaced the original procedures to record debugging information, and these programmer defined procedures are then wrapped with standardized wrapper procedures for context preservation across a callback flow. For example, third party procedures may add new asynchronous I/O functionality to the application program, and then third party procedures are replaced with wrapper procedures for context preservation across a callback flow.

Optionally, context preservation of the original procedure and original callback procedure may be implemented with layering of context information, so that multiple context and/or state data may be stratified across complex, interrelated callback flows. For example, when preservation of resource usage for billing purposes is needed for resources with different cost bases, the context information may record the resource usages for each callback flow of each of the different resources automatically. For example, the application requires billing context preservation across callback threads using one context layer, and profiling and/or debugging context preservation across callback threads using a second context layer. For example, each context layer provides billing for each end-user and billing cost reduction may be calculated when end-users share resource use, such as access to commercial pay per view databases. For example, multiple context layers are used by one end-user in multiple parallel callback flows so that billing is performed in parallel consistently.

Optionally, context values are used for program debugging. For example, context data stores processor register values used to determine the abnormal termination of a callback thread.

Optionally, context values are used for profiling. For example, context data stores processor clock values used to determine the net processor time used to execute a callback flow. For example, context data stores number of internet transmission packets used to determine the bandwidth used to execute a callback flow. For example, context data stores number of hard disk access times to determine the hard disk usage per callback flow.

Optionally, context values are used for information technology system administration. For example, context data stores I/O speeds and transferred data quantities to determine the I/O bandwidth needs of the processor system and/or routing infrastructures.

Optionally, context values are used for administrative tasks. For example, context data stores number of threads and/or processor identification values used to process callback flows and callback flow completion times to determine if server farm systems are optimized.

Optionally, context values are used for end-user data. For example, context data stores end-user preferences to determine the defaults of an end-user request in the future.

Optionally, context values are chosen from a list of possible context values determined dynamically at run time by a configuration file. For example, context data contains billing information values in a sequential query language (SQL) database, such as client number, and at a later time a new client number is added to the database. The configuration file may include command SQL commands to retrieve the client number form the database and use the number to later store the billing information in the SQL database. Optionally, the context data storing and restoring procedures contain code to dynamically determine the storage location, data values, and/or other information to preserve across a callback flow. For example, such a context data preserving system may be viewed as a context preserving framework/generator/engine, a context preservation configuration, and a context preservation instance. The framework may be programmed once by the software programmer, and accept a configuration that may be modified dynamically when there is a change in a database entry. Each execution instance may use the framework and configuration to perform the context preservation across a callback flow, reducing the programming and qualification times needed.

Optionally, the context data are continuous values.
Optionally, the context data are categorical values.
Optionally, the context data are discrete values.
Optionally, the context data are text values.

Optionally, a program contains one callback flow with one callback procedure that needs preservation of context. For example, an original program contains one invocation of an original procedure with one callback parameter, and after modification one wrapper procedure is invoked instead of the original procedure storing one memory value. Upon invocation of the callback event, one wrapper callback is executed which restore one memory value and executes one original callback.

Optionally, a program contains multiple callback flows with one callback procedure that needs preservation of context. For example, an original program contains multiple invocations of an original procedure with one callback parameter, and after modification one wrapper procedure is invoked at each instance instead of the original procedure storing one memory value. Upon each invocation of each callback event, one wrapper callback is executed which restore one memory value and executes the one original callback.

Optionally, a program contains multiple callback flows with multiple callback procedures that need preservation of context. For example, an original program contains multiple invocations of an original procedure with one callback parameter, each callback parameter consisting of a callback procedure that invokes one or more additional callback procedures as defined in each callback procedure's callback parameter. After modification of all procedures and callback procedures, one wrapper procedure is invoked at each instance instead of the original procedure storing one or more memory values. Upon each invocation of each callback event, one wrapper callback is executed which restore one or more memory values and executes the one original callback. The one or more original callback has as a parameter a second callback procedure, and when invoked, the second callback procedure schedules a third callback procedure. By modifying all procedures and callback procedures, the one or more memory values may be preserved across all invocations of all callback flows.

Reference is now made to FIG. 2, which is an example of node.js JavaScript resembling pseudo-code to modify a procedure so that the context data is preserved, according to some embodiments of the invention. It may be noted that in example, and all other examples herein, procedures may be defined in the example node.js computer language syntax as "functions", but in other procedural computer languages the procedures may be referred to as routines, subroutines, method, subprogram or the like. In general, a procedure may be any sequence of program instructions that perform a specific task, packaged as a unit, and executed as a unit.

Reference is also now made to FIG. 3, which is an example of node.js JavaScript resembling pseudo-code to implement a wrapper callback procedure, according to some embodiments of the invention. Optionally, examples exist in other programming languages that are procedural languages and use mechanisms for asynchronous callback procedures. Once a computer program procedure is executed to modify an original procedure to allow preservation of context data as at 201, the modify procedure as defined at 202 may be executed by the processor. The modify procedure may accept as arguments reference to the original procedure and the index of the callback procedure in the list of arguments to the original procedure. The modify procedure may return a wrapper procedure to the calling procedure as at 203, which may instruct the processor to perform the actions of saving the callback procedure parameter for later use as at 204, and declaring a new wrapper callback object as at 205 which accepts as an argument the callback procedure parameter. The new wrapper callback object as defined at 301 may be constructed as at 303 accepting the callback procedure parameter from the original procedure. At the time of construction of the wrapper callback object during the execution of the wrapper procedure, the context data may be stored as at 304 using a getCurrentContext procedure. The getCurrentContext procedure may store the necessary memory and data values which during the execution of the wrapper callback procedure may need to be restored as at 306 prior to the execution of the callback procedure as at 307. The wrapper callback procedure is inserted into the argument list of the original procedure as at 206 and then the original procedure is executed as at 207.

For example, the setTimeout procedure is chosen to be modified to preserve context data. The programmer may specify the modify procedure once for the setTimeout procedure at the beginning of the application program to produce a setTimeout wrapper procedure. When the setTimeout procedure is executed in the program at a later time, the setTimeout wrapper procedure may be executed in place and may enable preserving the context data. When the modify procedure is executed with the setTimeout procedure as an argument, the setTimeout procedure is wrapped within a new wrapper setTimeout procedure to be executed whenever setTimeout procedure is invoked later. When executed, the wrapper setTimeout procedure, may receive the arguments to the setTimeout procedure, extracts the callback procedure, and prepares a wrapper callback object to store the context data and callback procedure, replaces the callback procedure parameter with a redirection to the wrapper callback procedure, and then executes the original procedure. When the callback of the original procedure is executed, the wrapper callback procedure is executed to first restore the saved context and then to execute the callback procedure.

For example, when a programmer has developed software code that implements a business logic model, and invokes a cascade of procedures that are performed in some cases synchronously and in some cases asynchronously, the programmer may enable context preservation of the complete program by modifying only the low level software platform procedures, and the context preserving functionality will be implemented throughout the program that uses the low level procedures, without need to specifically modify all procedures in the program.

Optionally, more than one level of a cascade of procedures is modified for context preservation. For example, if different layers of context preservation will assist in stratifying billing information by type, then each type of billing information may be enabled in a different context layer. Optionally, one context layermay be used for multiple context scopes, where the procedures for storing and restoring context data may accept a parameter that will define the scope of the context.

Optionally, other wrapper procedures and objects are implemented which preserve the context data between the original procedure and the callback procedure with additional functionality. For example, the wrapper procedures preserves the mapping of the callback procedures in the callback flow so that during cancellation of the callback flow and/or the original callback the processor automatically cancels one or more the wrapper callback procedures associated with the callback flow.

Reference is now made to FIG. 5, which is an example of node.js JavaScript resembling pseudo-code to modify an original procedure o that the context data and procedure mapping are preserved, according to some embodiments of the invention. Optionally, examples exist in other programming languages that are procedural languages and use mechanisms for asynchronous callback procedures. The alternative modify procedure may preserve the context data and store the mapping between the callback procedure and the wrapped callback procedure. As in the modify procedure, the modifyWithMapping procedure is executed to replace the original procedure with wrapped procedure as at 501 which enables preserving context data between the original procedure and the callback procedure. For example, the EventEmitter.addListener procedure is replaced with a wrapper EventEmitter.addListener procedure by the modifyWithMapping procedure. The wrapper EventEmitter.addListener procedure may be executed one or more times anytime later in the program in place of the EventEmitter.addListener procedure, using the callback procedure parameter supplied with each later invocation. The wrapper EventEmitter.addListener procedure in this example is defined as at 503 for performing the processor instructions for storing the callback procedure parameter as at 504, constructing a new wrapper callback object as at 505, which stores the current context and callback procedure. The callback procedure parameter is then replaced with the wrapped callback procedure as at 506. To store the mapping of the callback procedure and the wrapped callback procedure, the current context is retrieved as at 507 and modified to map between the callback procedure and the wrapped callback procedure as at 508. The original procedure is then executed as at 509. When the wrapper callback procedure is executed at a later time the procedure will first restore the context and then execute the wrapper procedure. When the callback flow of the process is cancelled, possibly during the execution of the callback procedure, the mapping between the callback procedure and the wrapper callback procedure allows cancelling the wrapper callback procedure.

Reference is now made to FIG. 6, which is an example of node.js pseudo-code to cancel a previously scheduled callback using stored mapping data, according to some embodiments of the invention. Optionally, examples exist in other programming languages that are procedural languages and use mechanisms for asynchronous callback procedures. When the EventEmitter.addListener procedure is modified to include the mapping of the callback procedure to the wrapper callback procedure, the EventEmitter.removeListener procedure should be modified to use the mapping to cancel the wrapped callback procedure as well as at 601. This cancelation may be performed with the modifyCanceling procedure as at 602, which replaces the EventEmitter.removeListener procedure with the EventEmitter.removeListener wrapper procedure as at 601. The EventEmitter.removeListener wrapper procedure comprises instructions to retrieve the callback procedure parameter from the arguments as at 604, get the current contest object as at 605, and retrieve the callback wrapped procedure context callback map as at 606. The callback wrapped procedure then replaces the callback procedure parameter in the argument list, and the original procedure, in this example the EventEmitter.removeListener procedure, is executed.

For example, when the EventEmitter.removeListener procedure is executed, the scheduled callbacks are destroyed using the mapping between the original callback and the wrapper callback without the programmer having to specifically program the cancelation scenario into the application.

Optionally, including mapping procedure information in the context data is used in manipulation of the callback flow, such as priority assignment, cancelling, and the like. For example, when procedures for creating a flow and cancelling a flow are used, the mapping is stored at the invocation of the flow and may be used later to cancel the wrapped callback.

Optionally, the context data is a computer environmental data value which is necessary during the execution of the callback procedure yet might not have been preserved by the program or computer system. For example the context data contains data values representing the time zone of the current clock setting. When prior to the execution of the callback procedure the time zone is changed, either manually by the user or automatically by the operating system, when the callback procedure is finally executed the time zone change may be reversed so that the callback procedure is executed with the correct time zone relative to the original procedure.

Optionally, the context data is profiling data used to measure the response time of the computer procedures during program run time. For example, when during testing of the computer program the quality assurance engineer wishes to confirm the response time is below the limit defined in the specifications, the engineer configures the context data to include time stamps for the execution of each callback procedure in the callback flow, and analyze these time stamps to confirm compliance with the specifications.

Optionally, the context data is financial data used billing purposes. For example, the end user is billed based on processor time used during the actions performed by the program, and the context data stores the processor usage data during execution of the callback flow.

Optionally, the context data is used for exception handling, system monitoring and/or resource management. For example, logging of exception handling, and/or resource usage is done when storing and restoring the context data, and analyzed later to monitor system load at different times during the day, week, month and/or year.

Optionally, context data preservation is done using a compiled programming language.

Optionally, context data preservation is done using an interpreted programming language.

Optionally, context data preservation is done using source code modifications where the code is received in a human readable text format.

Optionally, context data preservation is done using binary code modifications, including hexadecimal, binary, octal, and/or any computer readable representation.

Optionally, context data preservation is done with computer programming language which contains asynchronous callback procedures passed as parameters of the arguments to an original procedure.

For example, in the C, C++, and Pascal programming languages callback procedures are implemented as "function pointer" parameters in argument lists of the original procedure.

For example, in C#, VB.NET and other common language infrastructure programming languages callback procedures are implemented as delegate object parameters in argument lists of the original procedure.

For example, in .NET programming languages callback procedures are implemented as events and event handlers.

For example, procedural languages generally support first-class procedures, which are passed as callbacks to other procedures, stored as data or returned from procedures.

For example, some languages, such as Algol 68, Perl, Python, Smalltalk, newer versions of C# and VB.NET as well as most procedural languages, enable lambda expressions to be supplied as callback procedures.

For example, in some computer programming languages, such as Scheme, ML, JavaScript, Perl, Smalltalk, PHP and many others, callback procedures are closures.

For example, in object-oriented programming languages without function reference arguments, such as Java, callback procedures are simulated by passing an instance of an abstract class or interface, of which the receiver will call one or more methods, while the calling end provides a concrete implementation. Such objects may effectively be a bundle of callback procedures, plus the data they need to preserve and/or restore. They may be useful in implementing various design patterns such as Visitor, Observer, Strategy, and the like.

For example, the C++ programming language uses objects to provide their own implementation of the function call operation. The Standard Template Library may accept these objects, called functors, as well as function pointers, as parameters to various polymorphic algorithms, thereby implementing methods of callback procedures.

According to some embodiments of the present invention there are provided computerized devices, for context preservation between any procedure and an asynchronous callback procedure passed as a parameter to the original procedure. Such devices may be any computerized devices which contain one or more processors.

Optionally, asynchronous callback procedure context preservation is done on computerized devices without a user interface, where the processor instructions have been prepared on separate development devices and transferred as binary code to the computerized devices.

Optionally, asynchronous callback procedure context preservation is done on computerized devices which use a field programmable gate array as one or more processors.

Optionally, asynchronous callback procedure context preservation is done on computerized devices which use an embedded microcontroller as one or more processors.

Optionally, asynchronous callback procedure context preservation is done on computerized devices which have firmware used in one or more processors.

Optionally, asynchronous callback procedure context preservation is done on computerized devices which have the processor instructions present on an integrated circuit as pre-configured hardwired transistors.

Optionally, asynchronous callback procedure context preservation is done on computerized devices which are server computers.

Optionally, asynchronous callback procedure context preservation is done on computerized devices which are client computers.

Optionally, asynchronous callback procedure context preservation is done on computerized devices which are virtual server computers.

Optionally, asynchronous callback procedure context preservation is done on computerized devices which are cloud based services.

According to some embodiments of the present invention there are provided computerized media, containing processor instruction for context preservation between any procedure and an asynchronous callback procedure passed as a parameter to the original procedure.

Optionally, computerized media containing processor instruction for context preservation between any procedure and an asynchronous callback procedure is made available to the computer using any from the list of universal serial bus disk on key, compact disk, digital video disk, hard disk, floppy disk, magnetic tape, hard drive, optical drive, and the like.

Optionally, computerized media containing processor instruction for context preservation between any original procedure and an asynchronous callback procedure is made available to the computer using any data interface from the list of Ethernet, universal serial bus, general purpose interface bus, Firewire, Thunderbolt, wireless local area network, near field communication, worldwide interoperability for microwave access, infrared communication, or the like.

Optionally, computerized media containing processor instruction for context preservation between any original procedure and an asynchronous callback procedure is made available to the computer using any memory devices from the list of random access memory, read-only memory, electrically erasable programmable read-only memory, non-volatile random access memory, or the like.

As used herein the term "about" refers to ±10%.

The terms "comprises", "comprising", "includes", "including", "having" and their conjugates refer to "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed compositions or methods.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for providing at least one memory value present in computer memory during execution of a program procedure to be automatically available to an asynchronous callback procedure executed later, comprising:
   receiving a code containing at least one program procedure, said at least one program procedure having at least one input parameter to be executed as an asynchronous callback procedure;
   replacing said at least one program procedure in said code with at least one wrapper procedure, where each of said at least one wrapper procedure comprises instructions for:
      storing at least one memory value available to said asynchronous callback procedure prior to execution of said asynchronous callback procedure;
      storing said asynchronous callback procedure of said at least one input parameter;
      replacing each of said at least one input parameter with a wrapper callback procedure, said wrapper callback procedure comprising instructions for restoring said at least one memory value and then executing said asynchronous callback procedure; and
      executing said at least one program procedure;
   executing said code with said at least one wrapper procedure, providing said at least one memory value present during execution of said program procedure to be automatically available to said asynchronous callback procedure executed later,
   wherein execution of said asynchronous callback procedure initiates execution of at least one additional callback procedure, and each of said at least one additional callback procedure is performed by execution of corresponding said wrapper callback procedure which restores said at least one memory value prior to execution of said at least one additional callback procedure.

2. The method of claim 1, wherein said at least one wrapper procedure and said wrapper callback procedure are made available by at least one computerized interface of the types from a list of a source code file, a binary machine instruction file, a header file, a driver file, a library file, a compiled library file, and a remote procedure call.

3. The method of claim 1, wherein said at least one memory value comprises any data value from the list of local variable values, global variable values, local variable address values, global variable address values, state machine status data values, time data values, date data values, user identification data values, user input data values, server-side computer data values, client-side computer data values, server-side program computer data values, client-side program data values, billing information data values, processor thread information data values, counter data values, procedure timing data values, exception handling data values, system monitoring data values, and resource management data values.

4. The method of claim 1, wherein said at least one program procedure, said at least one asynchronous callback procedure, said at least one wrapper procedure, and said wrapper callback procedure are developed in a programming environment coded according to the programming syntax of at least one from a list of programming languages including Javascript, C#, .NET, Ruby, D, Python, Perl, Java, Groovy, and Scala.

5. The method of claim 4, wherein said programming environment is at least one from a list of Node.js, Tornado, Twisted, Perl Object Environment, libevent, Vert.x, Akka, EventMachine, and vibe.d.

6. The method of claim 1, wherein said at least one wrapper procedure additionally stores a mapping between said at least one asynchronous callback procedure and said wrapper callback procedure for use in a manipulation of at least one callback flow, and a manipulating wrapper procedure uses said mapping to manipulate said at least one callback flow.

7. The method of claim 6, wherein said manipulation comprises any from the list of priority assignment, and cancelling.

8. The method of claim 1, wherein the term procedure may refer to any from the list of a subroutine, a function, and a routine, as used in procedural programming languages.

9. A computer program product, comprising a non-transitory computer usable memory having a computer readable program code embodied therein, said computer readable program code containing processor instructions to implement a method for providing at least one memory value present in computer memory during execution of a program procedure to be automatically available to an asynchronous callback procedure executed later, comprising instructions for:
receiving a code containing at least one program procedure, said at least one program procedure having at least one input parameter to be executed as an asynchronous callback procedure;
replacing said at least one program procedure in said code with at least one wrapper procedure, where each of said at least one wrapper procedure comprises instructions for:
storing at least one memory value available to said asynchronous callback procedure prior to execution of said asynchronous callback procedure;
storing said asynchronous callback procedure of said at least one input parameter;
replacing each of said at least one input parameter with a wrapper callback procedure, said wrapper callback procedure comprising instructions for restoring said at least one memory value and then executing said asynchronous callback procedure; and
executing said at least one program procedure;
executing said code with said at least one wrapper procedure, providing said at least one memory value present during execution of said program procedure to be automatically available to said asynchronous callback procedure executed later,
wherein execution of said asynchronous callback procedure initiates execution of at least one additional callback procedure, and each of said at least one additional callback procedure is executed by corresponding said wrapper callback procedure which restores said at least one memory value prior to execution of said at least one additional callback procedure.

10. The computer program product of claim 9, wherein said at least one wrapper procedure and said wrapper callback procedure are made available by at least one computerized interface of the types from a list of a source code file, a binary machine instruction file, a header file, a driver file, a library file, a compiled library file, and a remote procedure call.

11. The computer program product of claim 9, wherein said at least one memory value comprises any data value from the list of local variable values, global variable values, local variable address values, global variable address values, state machine status data values, time data values, date data values, user identification data values, user input data values, server-side computer data values, client-side computer data values, server-side program computer data values, client-side program data values, billing information data values, processor thread information data values, counter data values, procedure timing data values, exception handling data values, system monitoring data values, and resource management data values.

12. The computer program product of claim 9, wherein said at least one program procedure, said at least one asynchronous callback procedure, said at least one wrapper procedure, and said wrapper callback procedure are developed in a programming environment coded according to the programming syntax of at least one from a list of programming languages including Javascript, C#, .NET, Ruby, D, Python, Perl, Java, Groovy, and Scala.

13. The computer program product of claim 9, wherein said programming environment is at least one from a list of Node.js, Tornado, Twisted, Perl Object Environment, libevent, Vert.x, Akka, EventMachine, and vibe.d.

14. The computer program product of claim 9, wherein said at least one wrapper procedure additionally stores a mapping between said at least one asynchronous callback procedure and said wrapper callback procedure for use in cancelling at least one callback flow, and a cancelling wrapper procedure uses said mapping to cancel said at least one callback flow.

15. The computer program product of claim 9, wherein the term procedure may refer to any from the list of a subroutine, a function, and a routine, as used in procedural programming languages.

16. A computerized device for providing at least one memory value present in computer memory of the computerized device during execution of a program procedure to be automatically available to an asynchronous callback procedure executed later, comprising:
at least one hardware processor configured for executing the following code instructions:
first code instructions for receiving a code containing at least one program procedure, said at least one program procedure having at least one input parameter to be executed as an asynchronous callback procedure;
second code instructions for replacing said at least one program procedure in said code with at least one wrapper procedure, where each of said at least one wrapper procedure comprises code instructions for:
storing at least one memory value available to said asynchronous callback procedure prior to execution of said asynchronous callback procedure;
storing said asynchronous callback procedure of said at least one input parameter;
replacing each of said at least one input parameter with a wrapper callback procedure, said wrapper callback procedure comprising instructions for restoring said at least one memory value and then executing said asynchronous callback procedure; and
executing said at least one program procedure;
third code instructions for executing said code with said at least one wrapper procedure, providing said at least one memory value present during execution of said program procedure to be automatically available to said asynchronous callback procedure executed later,
wherein execution of said asynchronous callback procedure initiates execution of at least one additional callback procedure, and each of said at least one additional callback procedure is executed by corresponding said wrapper callback procedure which restores said at least one memory value prior to execution of said at least one additional callback procedure.

17. The computerized device of claim 16, further comprising a computer housing for containing said at least one hardware processor, said at least one input and output interface, and said at least one user interface, said computer housing configured to operate in the environment the device is located in.

18. The computerized device of claim 16, wherein the term procedure may refer to any from the list of a subroutine, a function, and a routine, as used in procedural programming languages.

* * * * *